(12) United States Patent
Avery

(10) Patent No.: US 8,069,977 B2
(45) Date of Patent: Dec. 6, 2011

(54) SLIDER BED CONVEYOR

(75) Inventor: Mark J. Avery, Plymouth, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 340 days.

(21) Appl. No.: 12/393,103

(22) Filed: Feb. 26, 2009

(65) Prior Publication Data
US 2010/0213037 A1 Aug. 26, 2010

(51) Int. Cl.
*B65G 41/00* (2006.01)
(52) U.S. Cl. .............. 198/861.2; 198/861.1; 198/750.1
(58) Field of Classification Search .............. 198/861.1, 198/861.2, 750.4, 750.1, 750.2; 193/6, 25 S
See application file for complete search history.

(56) References Cited

U.S. PATENT DOCUMENTS

| | | | | |
|---|---|---|---|---|
| RE21,349 E | * | 2/1940 | Jarrett | 198/765 |
| 2,239,578 A | * | 4/1941 | Sloane | 198/765 |
| 2,974,777 A | * | 3/1961 | Marsh | 198/827 |
| 3,047,129 A | * | 7/1962 | Wiener | 198/729 |
| 3,557,937 A | * | 1/1971 | Kahre | 198/861.2 |
| 3,581,877 A | | 6/1971 | Goldberg | |
| 3,762,532 A | * | 10/1973 | Nelson | 198/309 |
| 3,986,600 A | * | 10/1976 | Pentith | 198/735.6 |
| 4,167,998 A | * | 9/1979 | Zitz et al. | 198/813 |
| 4,256,213 A | * | 3/1981 | Shaw et al. | 198/303 |
| 4,261,460 A | * | 4/1981 | Peterson, II | 198/828 |
| 4,339,031 A | * | 7/1982 | Densmore | 198/861.2 |
| 4,524,864 A | * | 6/1985 | Peterson, II | 198/828 |
| 4,538,722 A | * | 9/1985 | Sumner | 198/861.2 |
| 4,736,835 A | * | 4/1988 | Hinkle | 198/860.1 |
| 4,742,904 A | * | 5/1988 | Miller | 198/735.6 |
| 4,789,056 A | * | 12/1988 | Bourbeau | 198/823 |
| 5,033,605 A | * | 7/1991 | Marquart | 198/300 |
| 5,096,048 A | * | 3/1992 | Lachner et al. | 198/733 |
| 5,156,258 A | * | 10/1992 | Steinkuhl et al. | 198/735.6 |
| 5,224,582 A | * | 7/1993 | Hahn et al. | 198/735.6 |
| 5,255,609 A | * | 10/1993 | Miyagawa et al. | 104/111 |
| 5,680,925 A | * | 10/1997 | Gallagher et al. | 198/861.1 |
| 5,762,178 A | | 6/1998 | Tarlton | |
| 6,003,858 A | | 12/1999 | Gunschera et al. | |
| 6,086,061 A | * | 7/2000 | Vedoy et al. | 271/3.01 |
| 6,227,357 B1 | * | 5/2001 | Brown, Sr. | 198/861.4 |
| 6,619,473 B2 | * | 9/2003 | Romeo | 198/836.1 |
| 6,637,580 B1 | | 10/2003 | Sneed | |
| 6,651,804 B2 | * | 11/2003 | Thomas et al. | 198/594 |
| 6,662,939 B1 | * | 12/2003 | McCusker et al. | 198/861.1 |
| 6,698,580 B2 | | 3/2004 | Diego | |
| 6,848,514 B1 | * | 2/2005 | Theurer et al. | 171/16 |
| 7,222,731 B2 | | 5/2007 | Taylor et al. | |
| 7,267,223 B2 | * | 9/2007 | Spoors | 198/860.1 |
| 7,383,936 B2 | | 6/2008 | Enomoto | |
| 7,438,180 B1 | * | 10/2008 | Taylor et al. | 198/861.2 |
| 7,562,764 B2 | * | 7/2009 | Schmidt et al. | 198/735.6 |
| 7,575,112 B2 | * | 8/2009 | Lowes et al. | 198/358 |
| 2004/0251111 A1 | | 12/2004 | LeCroy | |
| 2004/0262120 A1 | | 12/2004 | leCroy | |
| 2007/0230656 A1 | | 10/2007 | Lowes et al. | |

* cited by examiner

*Primary Examiner* — Joseph A Dillon, Jr.
(74) *Attorney, Agent, or Firm* — Dickinson Wright PLLC

(57) ABSTRACT

The subject invention provides for a slider bed conveyor system that allows for lateral movement of a longitudinally moving conveyor of a fixed length. The system includes a first conveyor section having a first surface that extends between opposing first walls. A second conveyor section is operatively connected with the first conveyor section and includes a second surface that extends between opposing second walls. The first and second conveyor sections support the longitudinally moving conveyor and the second conveyor section is laterally moveable in relation to the first conveyor section.

14 Claims, 3 Drawing Sheets

SLIDER BED CONVEYOR

BACKGROUND OF THE INVENTION

1. Field of the Invention

The subject invention relates to a conveyor system and more particularly to a slider bed conveyor system for allowing longitudinal and lateral movement of a longitudinally moving conveyor of a fixed length.

2. Description of the Prior Art

Conveyors of numerous designs have been used in the past to transport articles from one area to another. Known conveyors have employed endless belts, segmented slats, slider beds and other elements to move objects along their path of transport.

A slider bed conveyor is typically made in a fixed conveyor length and consists of a channel-shaped section or plurality of sections for supporting an endless belt conveyor. Typically, a slider bed conveyor is cut to a predetermined length or size and includes a sliding surface and opposing conveyor walls that form the channel shape that supports the belt conveyor. Additionally, a plurality of conveyor sections may be welded together or manufactured to the desired slider bed conveyor length. These rigid conveyors frequently cross joints in buildings such as expansion joints and seismic isolation joints. Slider bed conveyors and their conveyor sections are generally non-adjustable and do not allow for freedom of movement when crossing building expansion or seismic isolation joints. These joints induce strain on the conveyor, particularly slider bed conveyors with endless belts, as they try to stretch or compress the fixed length conveyor. In the past little has been done to address the movement in the building versus the conveyor resulting from expansion and seismic isolation joints.

Other conveyor systems have been proposed which utilize a plurality of slider bed conveyors placed in series to manufacture the desired slider bed conveyor length. In such a system, each slider bed supports separate endless belt conveyors. This multi-sectional, multi-belt conveyor is typically constructed of a drive section and a plurality of driven sections, which can be added as required to lengthen the conveyor system. The drive section is provided with a motor. The power of the single motor is transmitted to the driven sections by use of a power transmission system. Many such systems are known in the art, with the most common being the drive shaft systems and the belt drive systems. Additionally, the use of a coupler, employing gears may be used to transmit power from section to section. The use of drive shaft systems, belt drive systems, couplers and gears may also be problematic when crossing building expansion or seismic isolation joints.

It is, therefore, desirable to provide an improved slider bed conveyor system that accommodates irregularities in the path of the conveyor system due in part to building expansion or seismic isolation joints and provide improved operative features relating to performance.

SUMMARY OF THE INVENTION

The subject invention relates to a conveyor system and more particularly to a slider bed conveyor system for allowing lateral movement of a longitudinally moving conveyor of a fixed length. The system includes a first conveyor section having a first surface that extends between opposing first walls. A second conveyor section is operatively connected with the first conveyor section and includes a second surface that extends between opposing second walls. The first and second conveyor sections support the longitudinally moving conveyor and the second conveyor section is laterally moveable in relation to the first conveyor section.

In an alternative embodiment, the subject invention provides for a third conveyor section having a third surface that extends between opposing third walls and supports the longitudinally moving conveyor. The third conveyor section operatively engages one of the first and second conveyor sections and is slidably moveable in a longitudinal direction with respect to the first or second conveyor section.

The subject invention provides for both lateral and longitudinal movement of the slider bed conveyor system to allow crossing building expansion and seismic isolation joints without causing undue strain in the conveyor system due to building movement from a seismic event or other cause.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims and the accompanying drawings in which:

DETAILED DESCRIPTION OF THE PREFERRED EMBODIMENT

Figure 1:
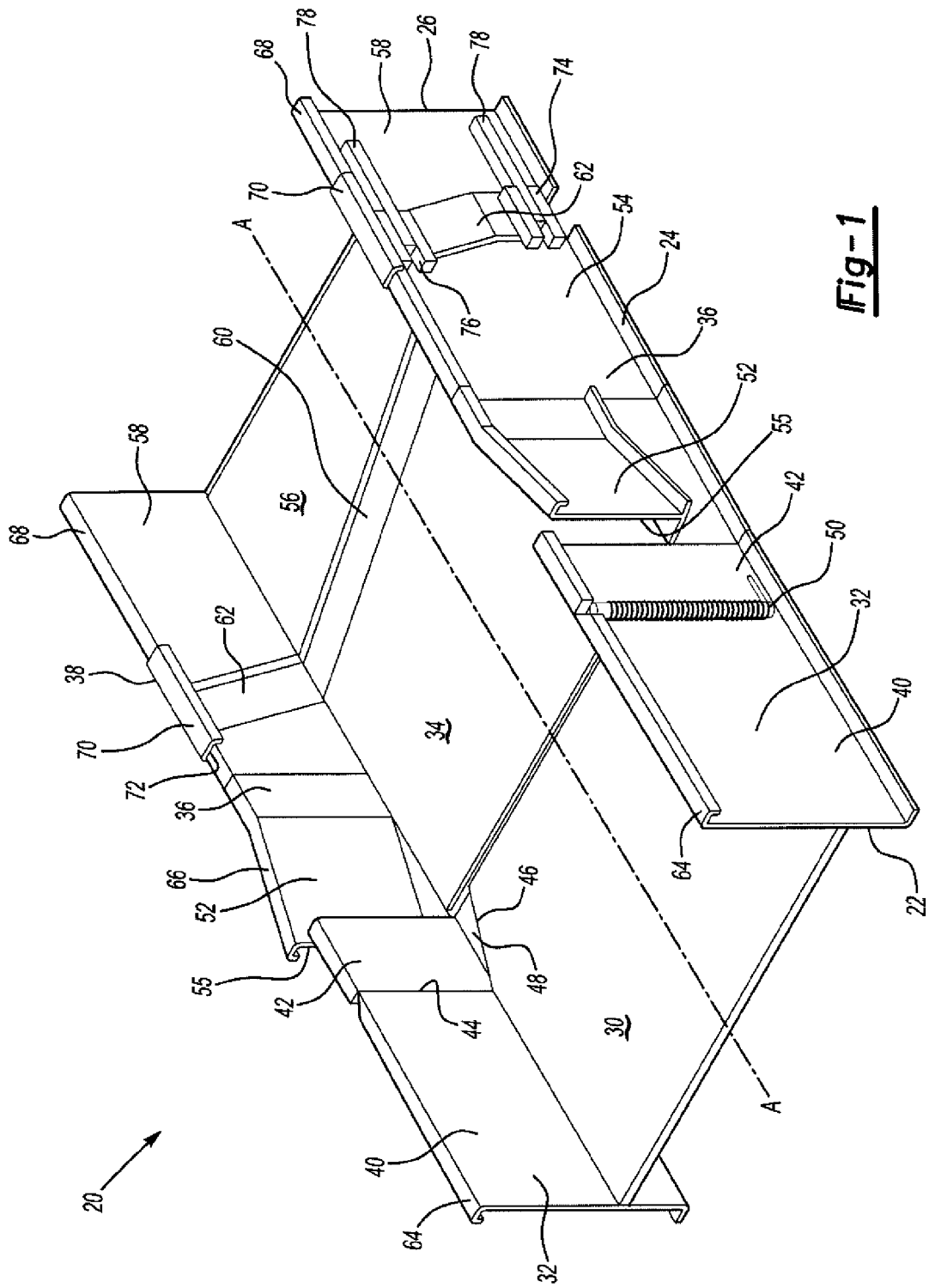
FIG. 1 is a perspective view of an exemplary slider bed conveyor system of the subject invention.

Referring to the Figures, wherein like numerals indicate corresponding parts throughout the several views, a slider bed conveyor system 20 for allowing lateral movement of a longitudinally moving conveyor of a fixed length is generally shown.

The slider bed conveyor system 20 of the subject invention includes a plurality of conveyor sections 22, 24, 26 being operatively connected for supporting a conveyor of a fixed length. At least two of adjacent conveyor sections 22, 24 are laterally moveable relative to each other while supporting the conveyor. For the purposes of this application, longitudinal movement is movement along the travel path of the conveyor and an axis A. Lateral movement is movement perpendicular to the axis A. The conveyor is typically an endless belt conveyor but may be any conveyor known in the art. When using a belt conveyor, a head idler roller and a tail idler roller are rotatably mounted respectively at the head and tail end of the slider bed conveyor system 20. The system 20 may include a motor that drives at least one of the head idler roller and tail idler roller. The idler rollers may be powered by any method known in the art.

In an exemplary embodiment, the conveyor sections 22 and 26 of the slider bed conveyor system 20 are positioned or fixed to a suitable supporting surface, such as a building floor, ceiling or wall. In the exemplary embodiment, conveyor section 22 is fastened to the suitable supporting surface on one side of a building joint while the conveyor section 26 is fastened to the other side of the building joint, and conveyor section 24 floats between the anchored conveyor sections 22 and 26. The conveyor sections 22 and 26 can be fastened to the floor, ceiling or wall using any suitable mechanical connector known in the art, such as an anchored bolt. In an exemplary embodiment, each of the conveyor sections 22 and 26 may comprise at least one support leg 28 extending therefrom that can be fastened to the supporting surface. The support leg 28, may be adjustable to control the desired height of the slider bed conveyor system 20.

The slider bed conveyor system 20 of the subject invention includes a first conveyor section 22 having a first surface 30 that extends between opposing first walls 32. The first surface 30 supports the longitudinally moving conveyor. The first conveyor section 22 carries the conveyor belt (not shown) on the first surface 30 for longitudinal movement over the length of the first conveyor section 22.

The first conveyor section 22 may be formed from a plurality of sheets of material, such as aluminum, steel or any other material known in the art, that are welded or secured to one another by any method known in the art. Additionally, a single sheet of planar material may be suitably bent, formed, cast, or extruded into the configuration of the first conveyor section 22 and channel-shaped first walls 32.

A second conveyor section 24 is operatively connected to the first conveyor section 22 and includes a second surface 34 that extends between opposing second walls 36. The second surface 34 also supports the longitudinally moving conveyor. The second surface 34 of the second conveyor section 24 may be longitudinally spaced from the first surface 30 of the first conveyor section 22. The second conveyor section 24 carries the conveyor belt on the second surface 34 for longitudinal movement over the length of the second conveyor section 24.

The second conveyor section 24 may be formed from a plurality of sheets of material, such as aluminum, steel or any other material known in the art, that are welded or secured to one another by any method known in the art. Additionally, a single sheet of planar material may be suitably bent, formed, cast, or extruded into the configuration of the second conveyor section 24 and channel-shaped second walls 36.

The second conveyor section 24 is laterally moveable in relation to the first conveyor section 22. The longitudinally moving conveyor travels over both the first surface 30 of the first conveyor section 22 and the second surface 34 of the second conveyor section 24. Movement in the supporting surface, for example, joints in supporting surface, such as building expansion joints and seismic isolation joints, may cause the first and second conveyor sections 22, 24 to move laterally relative to one another while still allowing the longitudinally moving conveyor to travel without undue stress or strain imparted on the slider bed conveyor system 20.

Figure 2:
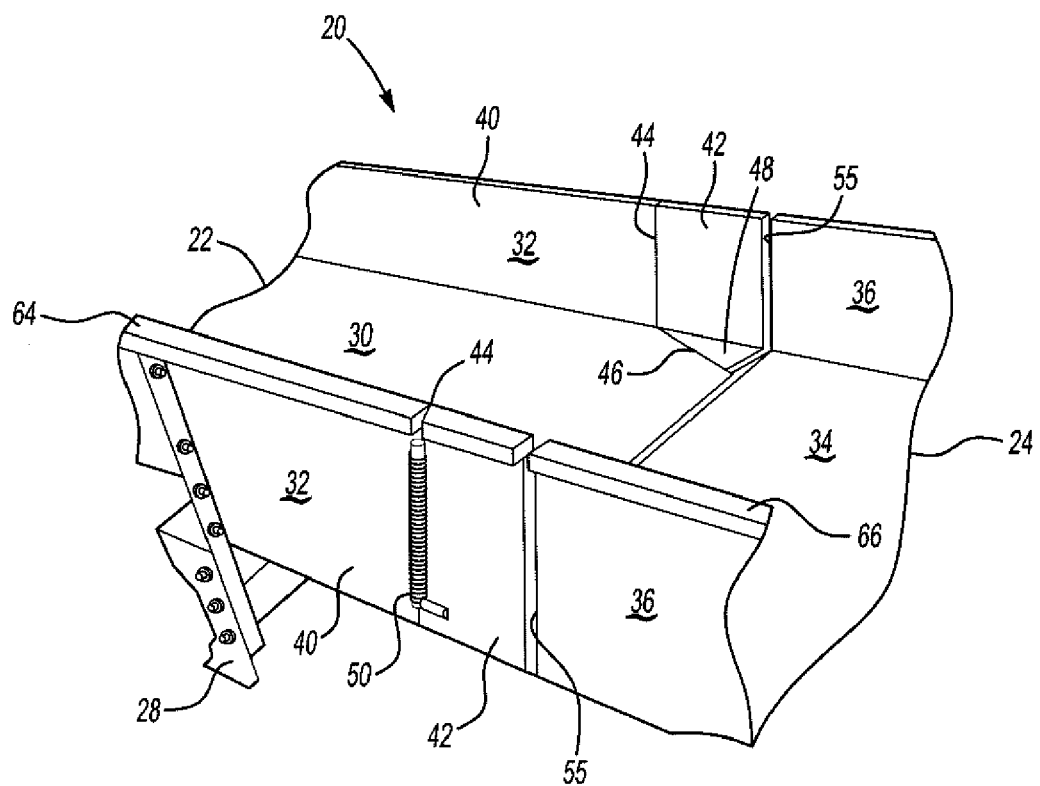
FIG. 2 is partial perspective view of an exemplary hinged portion of the subject invention.
Figure 3:
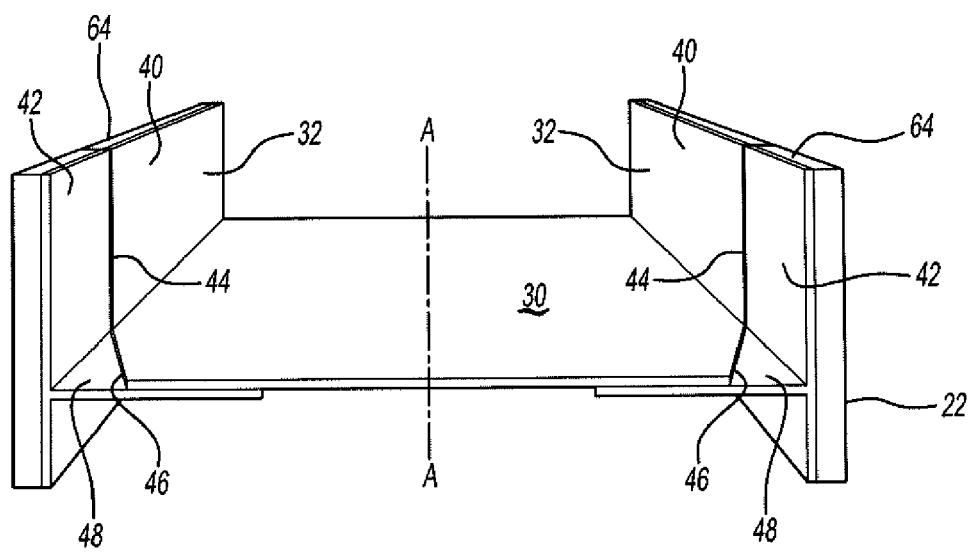
FIG. 3 is a front end view of the exemplary hinged portion of FIG. 2.
Figure 4:
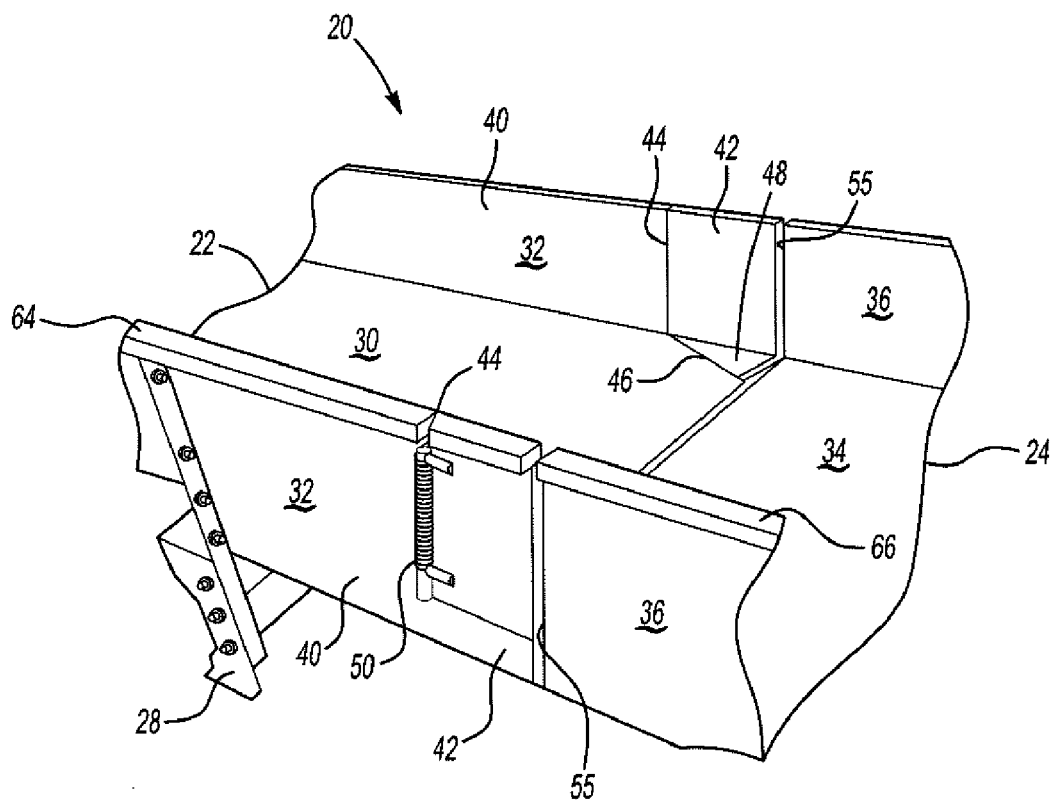
FIG. 4 is partial perspective view of an exemplary hinged portion of the subject invention.
Figure 5:
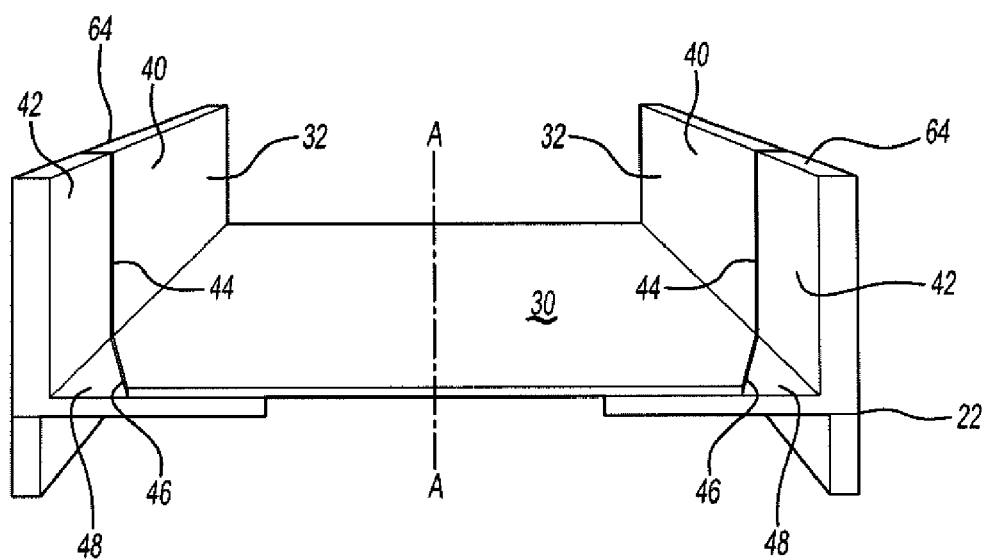
FIG. 5 is a front end view of the exemplary hinged portion of FIG. 4.

The first walls 32 of the first conveyor section 22 include a first fixed portion 40 and a hinged portion 42. The hinged portion 42 is secured to the corresponding first fixed portion 40 at a pivot 44. The hinged portion 42 is movable rotatably about the pivot 44 as the first conveyor section 22 moves laterally in relation to said second conveyor section 24. The hinged portion 42 may extend the entire height of the first wall 32 as seen in FIGS. 2 and 3, or only a portion of the height of the first wall 32 as seen in FIGS. 4 and 5. In the initial setup of the slider bed conveyor system 20, the hinged portions 42 and the first fixed portions 40 will form the continuous first walls 32 that run parallel to the axis A and path of travel of the conveyor.

In the exemplary embodiment, the first surface 30 includes a gap 46. The gap 46 is adjacent each of the hinged portions 42 and allows for the hinged portions 42 to be movable rotatably about the pivot 44. The hinged portion 42 may include a hinged surface 48 that extends inwardly from the hinged portion. The hinged surface 48 operatively engages the first surface 30 at the gap 46 and maintains the first surface 30 as first conveyor section 22 moves laterally relative to said second conveyor section 24.

As the belt conveyer moves longitudinally along the path of travel, it is possible for the belt conveyor to become off centered. This may be due to movement of the supporting surface which causes the first conveyor section 22 to move laterally relative to the second conveyor section 24. In the exemplary embodiment, the hinged portion 42 of conveyor section 22 accommodates for this lateral movement by pivoting about pivot 44 from its initial setup.

The first conveyor section 22 may include a biasing mechanism 50 that is disposed at each of the pivots 44. The biasing mechanisms 50 bias the hinged portions 42 to its initial setup to be parallel to the axis A and path of travel of the conveyor. The biasing mechanism 50 may be a spring, such as a torsion spring or any other biasing mechanism 50 known in the art. In an exemplary embodiment, as the first and second conveyor sections 22, 24 move laterally relative to one another, the biasing mechanism 50 will apply a pressure to the hinged portion 42 thereby causing the path of travel of the first conveyor section 22 to be at least partially aligned with second conveyor section 24.

The second walls 36 of the second conveyor section 24 may include a funnel portion 52 extending outwardly from a second fixed portion 54. The funnel portions 52 are disposed adjacent the hinged portions 42 of the first conveyor section 22. The funnel portion 52 accommodates lateral movement between the first and second conveyor sections 22, 24 by funneling articles on the conveyor back toward the center of the conveyor. The funnel portion 52 may also limit damage to the articles traveling down the conveyor. As the first conveyor section 22 moves lateral relative to the second conveyor section 24, end edge 55 of the second conveyor section 24 may be exposed to the path of travel of the article. The articles, such as luggage may get caught on the edge 55 causing damage to the baggage. The funnel portion 52 limits this problem by moving the edge 55 of the funnel portion 52 outwardly so that the luggage will hit the funnel wall, as opposed to the edge 55, when the first conveyor section 22 moves laterally relative to the second conveyor section 24.

The slider bed conveyor system 20 may include a third conveyor section 26 having a third surface 56 that extends between opposing third walls 58. The third conveyor section 26 supports the longitudinally moving conveyor. The third conveyor section 26 operatively engages one of the first or second conveyor sections 22, 24 and is slidably moveable in a longitudinal direction with respect to the first or second conveyor section 22, 24. The third conveyor section 26 carries the conveyor belt on the third surface 56 for longitudinal movement over the length of the third conveyor section 26.

The third conveyor section 26 may be formed from a plurality of sheets of material, such as aluminum, steel or any other material known in the art, that are welded or secured to one another by any method known in the art. Additionally, a single sheet of planar material may be suitably bent, formed, cast, or extruded into the configuration of the third conveyor section 26 and channel-shaped third walls 58.

The slider bed conveyor system 20 may include an expansion joint 38 that operatively connects the third conveyor section 26 and the adjacent first or second conveyor section 22, 24. The expansion joint 38 includes an expansion surface 60 that extends between opposing expansion walls 62. The expansion surface 60 is disposed between the third surface 56 and the adjacent first or second surfaces 30, 34 to maintain a continuous surface between the third surface 56 and the adjacent first or second surfaces 30, 34 as third surface 56 moves longitudinally relative to the adjacent first or second surfaces 30, 34. The expansion joint 38 carries the conveyor belt on the expansion surface 60 for longitudinal movement over the length of the expansion joint 38.

The expansion joint 38 may be formed from a plurality of sheets of material, such as aluminum, steel or any other material known in the art, that are welded or secured to one another by any method known in the art. Additionally, a single sheet of planar material may be suitably bent, formed, cast, or extruded into the configuration of the expansion joint 38 and channel-shaped expansion walls 62.

In the exemplary embodiment, the expansion surface 60 of expansion joint 38 is disposed beneath the third surface 56 and the adjacent first or second surfaces 30, 34. Additionally, the expansion surface 60 may be disposed above the third surface 56 and the adjacent first or second surfaces 30, 34. The placement of the expansion surface 60 beneath the adjacent surfaces 30, 34, 56 maintains a continuous surface as the adjacent surfaces 30, 34, 56 move longitudinally relative to each other.

In the exemplary embodiment, the first wall 32 includes a first lip 64, the second wall 36 includes a second lip 66, the third wall 58 includes a third lip 68 and the expansion wall 62 includes an expansion lip 70. The expansion lip 70 defines a channel 72 that slidably engages the third lip 68 and the first or second lip 64, 66 of adjacent first or second conveyor section 22, 24. As the third conveyor section 26 and the adjacent first or second conveyor section 22, 24 move longitudinally with respect to one another, the channel 72 of the third lip 68 allows for this longitudinal movement while securing the expansion joint 38 between the third conveyor section 26 and the adjacent first or second conveyor section 22, 24.

In the exemplary embodiment, the expansion walls 62 are disposed outwardly of the third walls 58 and the adjacent first or second walls 32, 36. Additionally, the expansion walls 62 may be disposed inwardly of the third walls 58 and the adjacent first or second walls 32, 36. The expansion walls 62 maintain a continuous support wall as the third conveyor section 26 and the adjacent first or second conveyor section 22, 24 move longitudinally with respect to one another.

The expansion walls 62 may include at least one support guide 74 that defines a slot 76. The third walls 58 may include a guide rail 78 that slidably engages the slot 76 of the support guide 74. The support guide 74 allows for longitudinal movement between the expansion joint 38 and the third conveyor section 26 while limiting the upward or downward movement of the expansion joint 38 relative to the third conveyor section 26.

The slider bed conveyor system 20 may include any combination of conveyor sections 22, 24, 26 discussed herein and/or additional conveyor sections, and the foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A slider bed conveyor system for allowing lateral movement of a longitudinally moving conveyor of a fixed length comprising:
    a longitudinally moving conveyor defining a path of travel along an axis;
    a first conveyor section having a first surface extending between opposing first walls to support said longitudinally moving conveyor as said longitudinally moving conveyor moves along said axis; and
    a second conveyor section operatively connected with said first conveyor section by said longitudinally moving conveyor and having a second surface extending between opposing second walls to support said longitudinally moving conveyor as said longitudinally moving conveyor moves along said axis, said second conveyor section being laterally moveable relative to said first conveyor section conveyor;
    wherein said second conveyor section is longitudinally spaced from said first conveyor section for allowing at least one of said first and second conveyor sections to move laterally relative to the other of said first and second conveyor sections, and each of said first walls of said first conveyor section includes a first fixed portion and a hinged portion secured to said corresponding first fixed portion at a pivot, said hinged portion being movable rotatably about said pivot as said first conveyor section moves laterally relative to said second conveyor section while continuing to support said longitudinally moving conveyor as said longitudinally moving conveyor moves along said axis.

2. The slider bed conveyor system as set forth in claim 1 including a biasing mechanism disposed at each of said pivots for biasing said hinged portions toward the longitudinally moving conveyor.

3. The slider bed conveyor system as set forth in claim 2 wherein said biasing mechanism is a torsion spring.

4. The slider bed conveyor system as set forth in claim 1 wherein said first surface includes a gap adjacent each of said hinged portions for allowing said hinged portions to be movable rotatably about said pivot.

5. The slider bed conveyor system as set forth in claim 4 including a hinged surface extending from said hinged portion and operatively engaging said first surface at said gap for maintaining said first surface as said first conveyor section moves laterally relative to said second conveyor section.

6. The slider bed conveyor system as set forth in claim 1 wherein each of said second walls include a second fixed portion and a funnel portion extending outwardly from said second fixed portion for accommodating lateral movement between said first and second conveyor sections.

7. The slider bed conveyor system as set forth in claim 6 wherein said funnel portions are disposed adjacent said hinged portions of said first conveyor section.

8. The slider bed conveyor system as set forth in claim 1 including a third conveyor section having a third surface extending between opposing third walls to support the longitudinally moving conveyor, said third conveyor section operatively engaging one of said first and second conveyor sections and being slidably moveable in a longitudinal direction relative to said first or second conveyor section.

9. The slider bed conveyor system as set forth in claim 8 including an expansion joint operatively connecting said third conveyor section and said adjacent first or second conveyor section.

10. The slider bed conveyor system as set forth in claim 9 wherein said expansion joint includes an expansion surface extending between opposing expansion walls, said expansion surface being disposed between said third surface and said adjacent first or second surface for maintaining a continuous surface between said third surface and said adjacent first or second surface as said third surface moves longitudinally relative to said adjacent first or second surface.

11. The slider bed conveyor system as set forth in claim 10 wherein said expansion surface is disposed beneath said third surface and said adjacent first or second surface for maintaining the continuous surface.

12. The slider bed conveyor system as set forth in claim 10 wherein said first wall includes a first lip, said second wall includes a second lip, said third wall includes a third lip and said expansion wall includes an expansion lip that defines a channel for slidably engaging said third lip and said first or second lip of said adjacent first or second conveyor section as said third conveyor section and said adjacent first or second conveyor section move longitudinally relative to one another.

13. The slider bed conveyor system as set forth in claim 10 wherein said expansion walls are disposed outwardly of said third walls and said adjacent first or second walls for maintaining a continuous support wall as said third conveyor section and said adjacent first or second conveyor section move longitudinally relative to one another.

14. The slider bed conveyor system as set forth in claim 10 wherein said expansion walls include at least one support guide defining a slot and said third walls include a guide rail for slidably engaging said slot of said support guide for limiting motion to longitudinal movement between said expansion joint and said third conveyor section.

\* \* \* \* \*